United States Patent Office 3,279,605
Patented Oct. 18, 1966

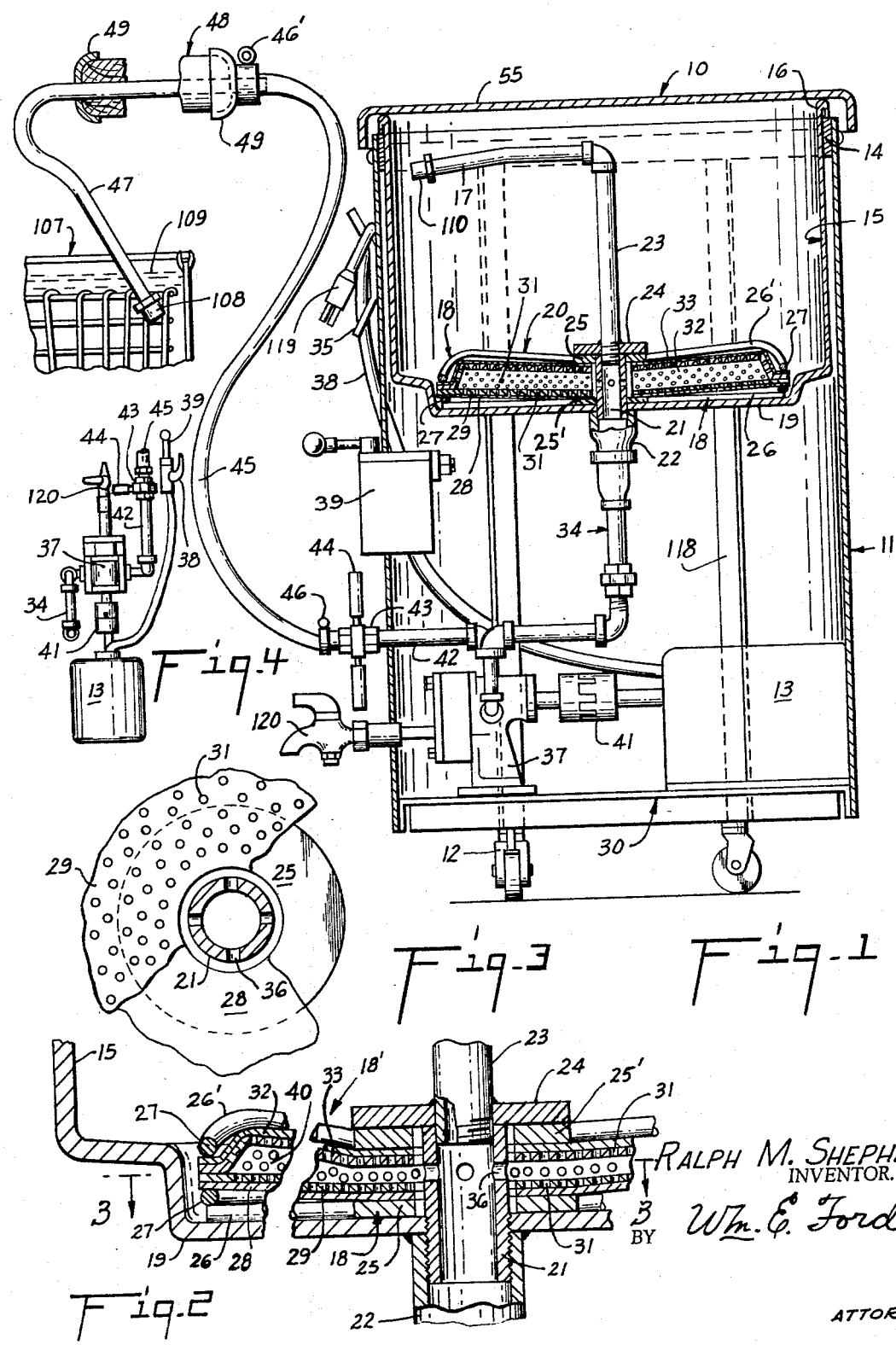

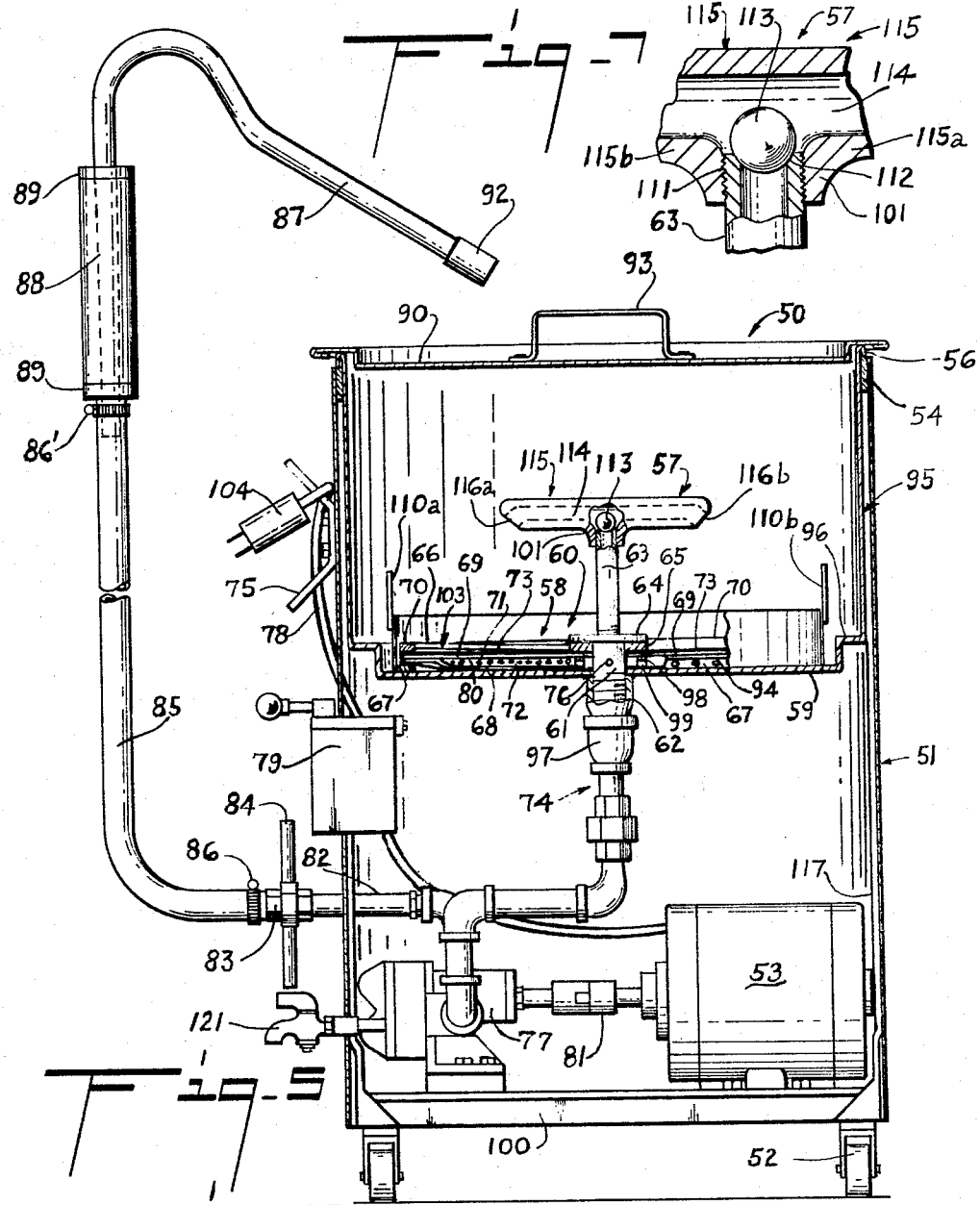

3,279,605
EDIBLE OIL FILTER
Ralph M. Shepherd, Marshall, Tex., assignor to Filtermaster Corporation, Marshall, Tex., a corporation of Texas
Filed Mar. 23, 1966, Ser. No. 536,805
10 Claims. (Cl. 210—110)

This invention relates to an edible oil filter as for purifying and separating harmful solids from fats used in deep fat frying; the invention also having a multiplicity of other usages in connection with various filtering processes, this application being a continuation-in-part application of copending application Serial No. 289,526, filed June 21, 1963, for edible oil filter, now abandoned.

As a primary object the invention provides a filter, as employed with fats of the class described, which is constructed to positively and forcefully direct matter to be filtered so that the harmful solids are separated from the oil fluids to be re-used, the fluids passing from within the filter pot and through diatomaceous earth supported by the filter pot and upon the filter means therein, and thence through the filter means and pass through a hollow stud to which the filter is connected.

It is another important object of this invention to provide a filter of this class in which the diatomaceous earth or filter aid is supported by the filter and by the filter pot with the filter being constructed in the manner that the fluids to be filtered pass both upwardly and downwardly through the filter means into a space within leading to the discharge stud.

It is also another and important object of this invention to provide a filter of this class in which the direction of circulation is reversible, the contaminated oil first being drawn from a source of use, as from a deep fat fry kettle, and discharged into the filter pot, then later the fluid being circulated through the filter pot to provide a homogeneous mixture with the filter aid, thus to deposit a filter cake on the filter after which the filtered oil is delivered for subsequent re-use.

It is also another object of this invention to provide a filter of this class from which the hose carrying the nozzle which picks up oil from the deep fat fry kettle is readily disconnectable from the pump line, and in which the circulating pump is adapted to be readily drained when not in use.

It is still another object of the invention to provide a filter of this class in which the filter sheets or diaphragms inwardly of the diatomaceous earth are of predetermined durability, porosity and micron retention.

It is also another and further object of this invention to provide a filter of this class in which the porosity is predetermined with pore size of sufficient smallness to exclude penetration by the smallest predetermined particle size of the surrounding diatomaceous earth.

It is also another object of the invention to provide a filter of this class which may be attached to a source of use resulting in contaminating oil in such manner that continuous circulation may be provided between the source and through the diatomaceous earth and filter means of the attached filter.

It is also an apparent object of this invention to provide filters of this class which are easily and inexpensively constructed, readily assembled and readily disassembled, as to change the filter media, all filter parts being accessible for service and exchange.

Other and further objects will be apparent when the specification herein is considered in connection with the drawings, in which:

FIG. 1 is an elevational view, part in section, of a portable, reversible flow form of the invention;

FIG. 2 is an enlarged sectional elevational view of the critical central structures of FIG. 1;

FIG. 3 is a sectional plan view taken along line 3—3 of FIG. 2;

FIG. 4 is a diagrammatic view of apparatus carried by the portable machine shown in FIGS. 1–3;

FIG. 5 is an elevational view, part in section, of a modified embodiment of the portable, reversible flow form of the invention shown in FIGS. 1–4, and comprising a preferred embodiment of the invention;

FIG. 6 is an enlarged, fragmentary sectional elevational view of the construction details of the filter as shown in smaller scale in FIG. 5; and FIG. 7 is an enlarged, fragmentary sectional elevational view of the details of a discharge nozzle as shown in smaller scale in FIG. 5.

Referring in detail to the drawings in which like reference numerals are applied to like elements in the various views, in a first embodiment of the invention shown in FIGS. 1–4, inclusive, a filter 10 is shown in FIG. 1 comprised of a housing 11 which is supported by caster rollers 12 connected to the base of the housing, two such rollers being shown in FIG. 1, although obviously three or four equally angularly spaced apart rollers could be used.

As shown, such rollers are connected to a support frame or bottom structure 30 which supports the cylindrical housing 11 thereabove. A support ring 14 is affixed inside the top of the housing and a round filter pot 15 is insertable through the top of the housing so that a bead 16 rests upon the upper surface of the ring 14. A removable round cover 55 is provided to close the top of the filter pot when it is not required to keep the pot open. The bottom or base 19 of the filter pot is centrally recessed and a filter assembly 20 is seated in the recess.

Such filter assembly 20 comprises a discharge stud or mandrel 21 which is insertable through a hole provided centrally through the recess or base 19 in the bottom of the pot 15, the lower end of the discharge stud 21 being threadably connected into a nipple 22 which is rigidly connected to the under surface of the recess or filter pot base 19.

The hollow stud or mandrel 21 has an upright pipe 23 connected threadably into the upper end thereof while the lower end thereof is externally threaded for engagement with the upper, internally threaded end of the stud 21, while a hold-down plate 24, which is rigidly welded to the pipe 23, shoulders upon the top surface of the stud 21 and thereby establishes the vertical height to which the pipe 23 upstands above the filter assembly 20. From the upper end of the pipe 23 a discharge spout or pipe 17 extends at slightly less than a right angle to discharge into the pot 15 above the filter assembly 20.

A hold-down spider or wheel 18 seats on the upper surface of the base or recess 19 and includes an annular plate or ring 25 which seats about the mandrel 21 and has equally angularly spaced apart rods or spokes 26 extending outwardly therefrom for peripheral connection to a filter support ring 27 which is shown seated on the outer ends of the spokes 26 and welded thereto, thereby allowing space therebelow for the oil to be filtered to pass thereunder and hence upwardly, as indicated by the arrow in FIG. 2.

A filter sheet 28 is shown in FIG. 2 supported upon a support spider or wheel 18. The filter sheet 28 is of a porous fibrous material, or of a plastic, or of a specific chemical and/or physical constituency best designed to hold back filter aid particles, as diatomaceous earth, and foreign particles, as from cooking, while permitting the edible oil to pass therethrough. The filter sheet 28 is of outer diameter to overextend the spokes 26 and the support ring 27 in outer diameter, and with an inner diameter to clear the mandrel 21, thus being substantially equal to the inner diameter of the annular ring 25. An annular perforated plate 29 seats upon the filter 28 and has substantially the same inner and outer diameter as the filter.

The perforations 31 in the pate are selected with care to provide for the character of the product to be filtered and for ordinary cooking oil it has been determined that $3/32''$ diameter holes on $9/64''$ centers or approximately 50 holes per square inch of plate is sufficient with a filter of conventional thickness and porosity, as applicable to edible cooking oils. Thus, the ration of opening space to total baffle or plate space in the drawings would be approximately 37%. Since the characteristics of oils, filter sheets, and pumps vary, critical limits may be asserted for this ratio to range from 25% to 50%. Thus, for very light oils which are easily filtered and considering a constant capacity source of suction, 25% opening space may suffice, on the other hand, when the cooking oils may vary from ordinary viscosity, a greater ratio of opening space to total plate area for more viscous oils, and up to 50% opening space may be required.

A baffle or perforated plate 33 is shown seated upon the lower baffle or perforated plate 29, which may be identically perforated or substantially identically perforated in correspondence with the perforations 31 in the lower baffle 29.

A filter sheet or filter disc 32 is shown supported by the upper perforated plate or baffle 33, such filter 32 being fabricated correspondingly as the filter sheet 28, and is of the same porosity, thickness, and filter characteristics.

Now as shown in FIGS. 1 and 2, it is obvious that upon the application of suction to the conduit assembly 34, which includes the nipple 22 and the mandrel 21, cooking oil will be pulled in between upper spokes 26' of the upper wheel or spider 18', such spokes 26' extending from an annular plate 25' which seats upon the upper filter 32, to pass downwardly through the upper filter 32, and through the perforations 31 of the upper baffle 33, and into a plenum chamber or space 40 to join with filtered oil passing upwardly, as indicated by the aforesaid arrow, to pass through the lower filter 28 and baffle 29.

Obviously, when the filter pot 15 has edible oil therein to be filtered and pump suction is exerted to pull downwardly through the conduit 34, the oil from the plenum space 40 must pass through ports 36 provided in the mandrel 21 between upper and lower baffles 33, 29, thereby to pass downwardly through the mandrel 21. Thence the filtered oils pass via conduit 34 into the instantly acting suction side of reversible pump 37.

As shown in FIG. 1, the filter includes an electric cord 38 mounted on a cleat 35 on the housing 11. Such cord 38 is plugged into a source of electric power whereby when a switch 39, also mounted on the housing, is turned to actuate a reversible motor 13, it starts and engages a clutch 41 to drive the pump 37, selectively, to draw filtered oil down conduit 34 or to discharge through conduit 34.

The oil as thus filtered in the pot 15 may be drawn from the filter pot 15 down the conduit 34 and through the pump 37 and delivered out a conduit 42, which is shown having a union 43 on the outer end thereof just outwardly of the housing 11. A hose 45 is connected to the outer end of the union 43 by means of a clamp 46. Wooden or heat insulated handles 44 are detachably connected to the union 43 so that the hose 45 may be quickly disconnected from the conduit 42 without burning the hands as otherwise would occur when very hot grease or oil were being handled.

The hose 45 connects to one end of a nozzle 47 which passes through a wooden handle 48 having metal end caps 49 at either end connected to the metallic member or nozzle 47, a clamp 46' being provided to connect the hose 45 to the end of the nozzle 47 adjacent the handle 48.

The operation of the filter may be better understood in the light of the following description of operation.

Assuming it is desired to strain and purify the fat or frying oil in a deep fat fryer 107, the cap 110 is removed from the nozzle 17, and the nozzle 47, with a perforated plug 108 installed thereon, is inserted into the fryer 107 approximately 1" below the top level of the cooking oil 109 to be purified, then the switch 39 is turned to a relative forward position so that the motor 13 actuates the clutch 41 to connect motor and pump, so that the motor 13 drives the pump 37 in the direction to take suction through the nozzle 47, hose 45, and conduit 42, thereby to draw the oil to be filtered from the deep fat fryer 107 and pass it through the pump 37 and by way of the conduit 34 upwardly through the union 22 and mandrel 21 and by way of the pipe 23 and uncapped nozzle 17 into the top of the filter pot 15. As this has progressed the operator has inserted the nozzle 47 further and further into the deep fat fryer 107 until substantially all of the cooking oil has been drawn therefrom for delivery into the filter pot 15.

A diatomaceous earth mixed with a conventional commercial product known to the trade as Sealite is now added to the cooking oil in the filter pot 15 in predetermined proportions required by the particular problems of filtering raised by the cooking oil to be purified.

When the deep fat fryer 107 has been substantially emptied, the perforated plug 108 is removed from the nozzle 47 and the open ended nozzle 47 is inserted into the top of the filter pot 15 to pick up the mixture of filter aid, oil, and impurities, to re-circulate it down the hose 45 and through the conduit 42, pump 37, and up the conduits 34 and 23, and back into the filter pot 15 until the oil and filter aid are thoroughly mixed.

As the next step, the pump 37 is stopped and the nozzel 47, with discharge end uncapped, is returned to the deep fat fryer 107 to discharge thereinto. Then the plug 110 is again installed to close the end of the nozzle 17 and a lid 55 is installed over the top of the filter housing 11. Then the switch 39 is turned to relative rearward position so that the pump takes suction down the mandrel 21 and through the conduit 34 whereby the pump 37 discharges the purified oil through the conduit 42 and hose 45 to the deep fat fryer 107.

As the nozzle 17 is plugged, the force of pump suction draws through the ports 36, so that the oil is strained through the filter aid which deposits on the outer surfaces of the filters 28 and 32, and passes through the perforations 31 of the baffles 29 and 33, into the plenum chamber 40 where the less resisted force of pump suction draws it through the ports 36 to pass down the mandrel 21 and conduit 34 to the pump 37 to be discharged therefrom by way of the conduit 42 and hose 45 and through the open ended nozzle 47 into the deep fat fryer 107. As thus returned, the cooking oil has been fully strained and goes back into the fryer 107 in a very high state of purification. The disposition of perforated baffles 29 and 33 to define a plenum chamber 40 and to support the filters 28 and 32, respectively, while the lower spider or wheel 18 spaces the lower filter 28 above the bottom of the recess 19 and the upper spider 18' holds down the upper filter 32, is a disposition of elements which constitutes a novel arrangement of filter elements which insures most effective results and a high degree of purity in the cooking oil passed therethrough.

At the same time, the ease by which the filter assembly 20 may be removed to permit the removal of the filters and the filter cakes thereon as comprised of filter aid and impurities deposited on the expendable filters, constitutes a basic feature of the invention. Also, provision of a lid or cover 55, obviously as a protective closure, performs the additional function of preventing dissipation of the force of suction when it is installed upon the top of the filter 20 when the oil is being drawn through the filter cake on the filter discs to be returned by the pump 37 to the deep fat fryer 107. A drain cock 120 is shown extending from the pump 37 and through the housing 11 in FIG. 1, whereby, when the motor 13 has been stopped, the pump 37 may be drained. This is usually done in point of time after the pump has pumped in a direction to deliver soiled oil into the filter pot 15 to be mixed with filter aid.

A preferred embodiment of the invention is shown in FIGS. 5–7, inclusive, as comprising a filter 50 having a cylindrical housing 51 including a bottom structure 100, the housing being supported by rollers 52 which are symmetrically disposed beneath, and connected to, the bottom structure. A support ring 54 is affixed inside the top of the housing 51. Filter pot 95 is insertable through the top of the housing 51 so that a bead 56, formed by recurving outwardly the upper rim of the filter pot, rests upon the upper surface of the support ring 54. A removable round cover 90 is provided as a closure for the filter pot when it is not in service. The bottom or base 59 of the filter pot 95 is centrally recessed to form a filter assembly receiving recess of slightly lesser diameter than the inside diameter of the pot. Thus, a shoulder or annulus 96 is provided between the recessed bottom 59 and the inner wall surface of the filter pot 95.

A filter assembly 60, which seats in the recessed bottom 59, includes centrally a discharge stud or mandrel 61 which is threadably connected into a nipple 62 which is rigidly connected to the under surface of the recessed bottom 59. The lower end of the nipple 62 is connected into the upper, larger diameter end of a reducer 97 comprising the uppermost element of a conduit assembly 74, to be hereinbelow described. The upper end of the mandrel or stud 61 has a hold-down plate 64 formed integrally therewith or affixed thereonto, and this plate 64 comprises the hold-down member for a filter element assembly 58, as will be understood from the following description.

An upstanding pipe 63 extends co-axially above the mandrel 61 and the internally threaded upper end of the mandrel has the lower end of the pipe 63 threadably engaged therein. A discharge T 57, to be hereinbelow described in detail, has its central leg 101 internally threaded to receive therein the externally threaded upper end of the upright pipe 63.

The above indicated filter element assembly 58 of the filter assembly 60 includes a ring 67 of slightly less outer diameter than the inner diameter of the recessed base or bottom 59, to be seated in the bottom or base 59 concentric therewithin, and concentric around the mandrel 61. The filter unit assembly includes a round, flat, perforated baffle plate 69, and also includes a centrally dished or recessed, perforated baffle plate 72 having a flanged rim 72a against which the peripheral area of the flat baffle plate 69 is matched in face to face contact. Also, the filter assembly 58 includes a filter sheet 68, of finely meshed fabric or preferably of a plastic or tissue material of predetermined or preselected porosity and thickness, the sheet being sized and shaped to cover the outer surface of the perforated, flanged baffle plate 72, while a correspondingly constituted, round filter sheet 73 is provided of diameter to cover and seat on the outer surface of the baffle plate 69.

A hold-down spider or wheel 103 comprises the upper element of the filter element assembly 58 and includes centrally a hub disc 65 which has a central opening to receive the mandrel 61 therethrough and which seats in assembly upon the upper filter sheet 73. Equally, angularly spaced apart rods or spokes 66 extend outwardly from the hub disc 65 to an outer or hold-down ring 70 which seats on the peripheral area of the sheet 73. Also, the filter element assembly may include an inner ring 98 which surrounds the mandrel 61, and which has ports 99 through the wall thereof. As recited in the case of the hub disc 65 of the hold-down wheel 103, and as shown in FIGS. 5 and 6, the upper filter sheet 73, upper baffle plate 69, lower baffle plate 72, and lower filter sheet 68, have central openings therethrough through which the mandrel 61 extends.

As in the case of the plates 29 and 33 hereinabove described for the form of invention shown in FIGS. 1–4, inclusive, the perforations 71 in the plates 69 and 72 are selected as to diameter and spacing to accommodate the character of the product to be filtered, and, as aforesaid, $\frac{3}{32}''$ diameter holes or perforations 71 on $\frac{9}{64}''$ centers, or approximately 50 holes per square inch of plate may be designated as satisfactory operable dimensions applicable to conventional edible cooking oils, when the perforated plates 69, 72 are covered with respective filter sheets 73, 68 of adequate thickness and porosity. In fact, as in the case of the perforated plates 29, 33 hereinabove described, if the opening space takes up from between 35% to 40% of the total plate area proper filtering for general purpose edible cooking oils can be accomplished. However, for very light oils, pump suction being considered constant, a ratio of 25% opening space through the baffles may be appropriate, or for very viscous cooking oils, a ratio of 50% opening space may be indicated as the best proportion.

The path through which suction can act, pulling downwardly through the conduit assembly 74, the nipple 62 and the mandrel 61 results in the cooking oil being pulled inwardly through the passages 94 in the lower ring 67 to pass upwardly through the filter sheet 68 and the perforations 71 of the dished filter plate or disc 72 into the plenum chamber 80 provided thereby. Also, the path of suction will draw the cooking oil to pass through the filter sheet 73 and the perforations 71 in the flat disc or plate 69 into the plenum chamber 80. Thence, from the plenum chamber 80, the filtered fluid or oil may pass through the ports 99 of the ring 98 and through the ports 76 into the mandrel 61 and downwardly through the conduit assembly 74 to the pump 77.

FIG. 5 shows a connecting conduit assembly 74, corresponding with the connecting conduit assembly 34 shown in FIG. 1. The assembly 74 includes in its top portion a reducer 97 which has its internally threaded upper end threadably engaged by the externally threaded lower and of a reducer or nipple 62 having its upper end welded to the under side of the filter pot 95 centrally thereof. Then, the externally threaded lower end of the mandrel 61, which extends downwardly through the center of the filter pot bottom 59, is threadably engaged into the internally threaded upper end of the reducer or nipple 62.

The bottom structure 100, at the lower end of the housing 51, has upright members or reinforcing bars 117 extending upwardly therefrom corresponding with angle construction indicated as bracing the housing 11 in FIG. 1. Also, the bottom structure 100 mounts the reversible motor 53 which is clutch-connected by a clutch 81 to drive the aforesaid pump 77. An electric cord 78, from the motor 53, is shown extending out through the housing 51 to hang on a cleat 75 on the outer surface of the housing, with the included plug 104 being selectively insertable wherever there may be a serviceable electrical outlet in the proximity of use of cooking oil in a fry kettle.

The filtered oil which the pump 77 may draw from the filter pot 95 is delivered out a rigidly extending discharge conduit 82, corresponding with the conduit 42 shown in FIG. 1. A union 83 on the outer end of the conduit 82 has handles 84 thereon which may be turned to connect the union with, or to disconnect the union from, a flexible conduit 85 having its lower end clamp-connected to the union by a clamp 86.

The flexible conduit or hose 85 receives an end of a rigid or metallic nozzle 87 in the outer or free end thereof, and a clamp 86′ clamps the hose to the nozzle end, the nozzle 87 extending through a wooden handle 88 having metal end-caps 89 at either end thereof corresponding with the metal end-caps 49, shown in FIG. 1. A perforated plug or strainer 92 is shown on the free end of the nozzle 87, corresponding with the strainer 108 and nozzle 47, shown in FIG. 1.

The form of the invention shown in FIGS. 5–7, inclusive, includes an improved filter element assembly 60 having a band or cylindrical metal sheet 106, which may be provided to extend around the lower ring 67 of the assembly, and to have its lower part affixed to the outer surface of the said lower ring 67. This band 106 extends to a height above the hold-down ring 103, as will be hereinbelow explained, and opposed handles 110a, 110b are installed thereon to extend upwardly thereabove whereby the whole filter element assembly 58 may be lifted together from the filter pot 95, as on occasions as when the mandrel 61, including the hold-down flange or plate 64, may first have been removed.

Also, in the form of invention shown in FIGS. 5–7, inclusive, the discharge T 57 is provided as an improvement over the discharge spout or pipe 17, shown in FIG. 1. In this case the short, central leg 101 of the T is of threaded inner diameter 111 to receive the externally threaded upper end of the upstanding pipe 63 which can thus be said to comprise a part of the central leg of the T, although, also it can be said to comprise the upper portion of the mandrel with which it is in co-axial extension.

The upper end of pipe 63 has a valve seat 112 formed therein on which may seat a ball valve element 113, as best shown in FIG. 7. The ball or valve element 113 is of outer diameter greater than the inner diameter bore or opening 114 through the cross-piece or cross-pipe 115 which provides the respective left and right legs 115a, 115b of the T, and thus it can be unseated by fluid, as delivered upwardly, but it cannot escape down the bore 114, either to the right or to the left. As is obvious in FIG. 5, the ends 116a, 116b of the cross-pipe 115 are swaged downwardly for proper direction of the fluid, as soiled oil, into the filter pot 95.

The operation of the filter disclosed in FIGS. 5–7 is generally like the filter shown in FIGS. 1–4, element by corresponding element, and function by corresponding function. That is, with the pump 77 switched in direction to draw in through the pick-up conduit, the nozzle 87, usually with strainer 92 installed, picks up the soiled oil, as from a deep fat fryer, corresponding with the deep fat fryer 107 indicated in FIG. 1, and the soiled oil is drawn through the flexible conduit 85 and the rigid conduit portion 82 into the pump 77 and discharged up the conduit assembly 74 into the mandrel 61 where it passes up the upright pipe 63 to lift the ball valve element 113 and pass down the cross-pipe bore 114 on both sides of the valve element, to be discharged from the discharge outlets 116a, 116b into the filter pot.

Then when the soiled oil has thus been transferred into the filter pot 95, the switch 79 is turned to reverse the direction of motor rotation and the motor 53 now drives the pump in a direction to take suction down the conduit assembly 74. In the meantime, an ample amount of filter aid, such as diatomaceous earth, has been added to the soiled oil by insertion through the top of the filter pot, and then the cover 90 has been replaced thereon.

The pump suction promptly seats the ball valve element 113 on its seat 112 so that all of the suction is concentrated to pull through the mandrel ports 76 and through the ports or passages 99 in the ring 98, when such ring is supplied. The full force of suction then draws against the space of the plenum chamber 80 and pulls the oil through the diatomaceous earth, not shown, which is distributed, as assisted by suction, to fill or take up all of the space in the lower part of the filter pot outwardly of the porous filter sheets or discs 73, 68.

The oil to be filtered is thus drawn by suction through the filter aid to cake it on the porous sheets 73, 68, and through the porous sheets 73, 68 and the perforate plates or discs 69, 72 into the plenum chamber 80. The oil is then drawn through the passages 99 (when a ring 98 is provided) and through the ports 76 into the mandrel 61. Thence, the filtered oil is drawn down the conduit 74 and into the pump 77 to be discharged up the pick-up conduit and delivered through the nozzle 87 when the strainer 92 is removed. When the oil is in early stages of filtering, or if it is badly soiled oil, it may be delivered back into the filter pot 95 to be recirculated therethrough, with or without the filter aid having been changed, as circumstances may dictate. Otherwise, when the oil appears cleared by filtration, the oil can be promptly directed to pass from the nozzle 87 back into a fry kettle or apparatus in which it is to be re-used.

The provision of the T 57 with the ball valve element 113 therein to seat when a filter pot is under suction, is a decided improvement over the arrangement shown in FIG. 1 where a plug 110 has to be installed each time suction is taken, and removed each time the direction of pump rotation is reversed to deliver soiled oil into the filter pot.

Also, the provision of the ring 67, with the ports 94 therethrough, is an improvement over the lowermost element or support wheel 18 of the embodiment of the invention shown in FIGS. 1–4, inclusive. This is obvious since it can be seen that, in the modification of FIGS. 5–7, the lower ring assumes the function of another perforate filter element in addition to its function as a support member.

Also, the provision of the band 106 around the bottom ring 67, provides an enclosing member for all the other filter assembly elements, and the handles 110a, 110b at the top of the band 106 makes it possible for the filter element assembly 58 to be lifted out of the filter pot, as, for instance, when the caked filter aid is to be removed from the filter discs 73, 68, or when the filter discs 73, 68 with the caked filter aid thereon are to be exchanged for clean filter discs.

Many variations of construction may be brought into play under various conditions. For instance, in case a heavy cylindrical shell or housing body 11 or 51 may be provided, the respective structural angle 118 or re-enforcing bars 117 may not be required. Also, as to locality of use, when electrical power may not be available, the respective electric motors, cords and plugs 13, 53, 38, 78, 119, 104 may be replaced by gasoline or diesel driven prime mover apparatus.

Also, construction of the filters shown in both forms of the invention is susceptible to some variety of variation. For instance, the relative upper and lower positions of the perforated plates or discs, in either form, are reversible. Also, whereas the hold-down ring 24 in FIGS. 1 and 2, is shown rigidly connected to the riser pipe 23 while the ring or flange 64 is FIGS. 5 and 6 is indicated as being an integral part of the mandrel 61, it is a matter of choice as to whether the hold-down ring or flange comprises a rigid part of the mandrel, or a rigid part of the pipe or riser thereabove, which is technically a part of the mandrel.

In summary, it is obvious that the invention may be practiced with the use of a wide range of combinations of structures which may serve to carry out the general objects thereof. Thus, the invention includes any and all structural combinations which may fall within the broad spirit thereof and within the broad scope of interpretation claimed for and merited by the appended claims.

What is claimed is:

1. An edible oil filter comprising a filter pot having a centrally bored, recessed base, a cover for said filter pot, and a housing supporting said filter pot upwardly therein and having a bottom structure therebelow, a reversible pump supported by said bottom structure, a mandrel upstanding in said pot above said bored recessed base, a delivery nozzle connected to the upper end of said mandrel, a connecting conduit between said pump and said base and connected to said pump and to the lower end of said mandrel, a filter assembly fitted around said mandrel and including upper and lower perforate discs disposed with outer annular areas in abutment, one of said discs being inwardly dished to provide a plenum chamber, upper and lower filter means stiffened by, and respectively fitting over said upper disc and under said lower disc, support means under said lower filter means and providing a space through which said filter pot communicates with its recessed base, a spoked hold-down ring upon said upper filter means, and a hold-down plate on said mandrel bearing upon said hold-down ring, said mandrel having port means therein to communicate said mandrel with said plenum chamber, said edible oil filter also including a pick-up conduit having a first portion connected to said pump opposite said connecting conduit, and extending rigidly outwardly through said housing, said pick-up conduit also having a second portion extending flexibly from said first portion exteriorly of said housing and including a pick-up nozzle to draw soiled fluid, as cooking oil, discharged by said pump upwardly through said connecting conduit and through said mandrel, and out through said delivery nozzle into said filter pot, said pick-up nozzle adapted to be inserted into said filter pot for re-circulation and mixing of said soiled cooking oil with a filter aid, means to close and to open said delivery nozzle selectively, whereby, with said pump reversed and with said delivery nozzle selectively closed, pump suction draws oil through said upper and lower filter means and from said plenum chamber through said mandrel port means as said filter aid cakes said upper and lower filter means, and through said pump to be delivered through said pick-up conduit and out through said pick-up nozzle as purified cooking oil, said filter assembly being removable so that the filter aid caked thereon may be expended and thereafter said filter assembly being placed back in said pot.

2. An edible oil filter as claimed in claim 1, which is portable and includes wheel means disposed below, and connected upwardly to, said bottom structure.

3. An edible oil filter as claimed in claim 1 in which said delivery nozzle comprises a T having a cross-member and a central leg connected onto the top of said mandrel, and providing a valve seat therein, said T having a ball valve element centrally therein to seat downwardly on said valve seat, the cross-member of said T having a passage diameter therein of lesser diameter than the diameter of said ball valve element.

4. An edible oil filter as claimed in claim 1 in which the upper perforate disc is the perforate disc which is dished to provide the plenum chamber.

5. An edible oil filter as claimed in claim 1 in which the lower perforate disc is the perforate disc which is dished to provide the plenum chamber.

6. An edible oil filter as claimed in claim 1 in which said support means comprises a metallic ring of outer diameter slightly less than the diameter of the recess in the filter pot base, said metallic ring having passageway means therethrough for communication, as aforesaid.

7. An edible oil filter as claimed in claim 1 in which said hold-down plate is carried by a riser comprising the uppermost part of said mandrel and to the top of which said delivery nozzle is connected.

8. An edible oil filter as claimed in claim 1 in which said mandrel includes a riser as the uppermost part thereof and to the top of which said delivery nozzle is connected, and in which said hold-down plate is integral with said mandrel, and disposed adjacent the lower end of said riser.

9. An edible oil filter as claimed in claim 1 in which said support means comprising a metallic ring as the lowermost element thereof to seat within said recessed base, and in which a band is provided to extend around, and to upstand from said ring and having opposed handles connected to the upper part thereof, said band and metallic ring having perforations therethrough for communication, as aforesaid.

10. An edible oil filter as claimed in claim 1 in which said filter assembly includes a ring between said upper and lower perforate discs and concentric around said mandrel, and which provides passage means therethrough between said plenum chamber and said mandrel port means.

References Cited by the Examiner
UNITED STATES PATENTS

| | | | |
|---|---|---|---|
| 1,750,185 | 3/1930 | McGeehan et al. | 210—193 |
| 2,362,231 | 11/1944 | Ackerly | 210—485 X |
| 2,720,983 | 10/1955 | Kracklauer | 210—347 |
| 2,874,846 | 2/1959 | Herster | 210—451 X |
| 3,045,827 | 7/1962 | Hough | 210—482 X |
| 3,107,601 | 10/1963 | Longmire | 210—167 X |
| 3,159,095 | 12/1964 | Wagner | 210—167 X |

REUBEN FRIEDMAN, *Primary Examiner.*

J. DECESARE, *Assistant Examiner.*